Dec. 18, 1962     R. S. WASHBURN     3,068,832
FLOW INDICATOR
Filed Aug. 10, 1959     2 Sheets-Sheet 1

Inventor
ROBERT S. WASHBURN

Dec. 18, 1962 — R. S. WASHBURN — 3,068,832
FLOW INDICATOR
Filed Aug. 10, 1959 — 2 Sheets-Sheet 2

Inventor
ROBERT S. WASHBURN

United States Patent Office
3,068,832
Patented Dec. 18, 1962

3,068,832
FLOW INDICATOR
Robert S. Washburn, Beloit, Wis., assignor to Beloit Iron Works, Beloit, Wis., a corporation of Wisconsin
Filed Aug. 10, 1959, Ser. No. 832,710
5 Claims. (Cl. 116—117)

This invention relates to a flow indicator, and more particularly to a flow indicator for monitoring the flow of "blow through" steam for paper machine and textile machine dryers or the like and for manufacturing applications where wet steam is used directly in the product.

In heat transfer devices such as paper machine and textile machine dryers, where a fraction of the steam input is required to be discharged as steam for maintenance of flow, purging and the like, as well as in applications such as pellet manufacture of feeds, fertilizer and similar products, it is generally required to know whether the flow of steam is at a level sufficient for the particular purpose. In paper machines, the steam system generally controls the input and differential pressure for groups of dryers rather than for individual dryers. If a disturbance in this system causes a single dryer to fill, the stability of the drying rate and of the paper machine drive may be adversely affected, and it is often difficult to discover which dryer or dryers have become filled.

Various devices are presently available for inspecting the flow of steam by means of sight glasses, but unless the operator has a high degree of skill and experience, such devices afford no quantitative indication of flow; and even the simplest flow meters are too expensive for use with paper machines because of the number required for each installation.

The present invention resolves these problems by means of an indicator affording a positive signal whenever the requisite fraction of steam input discharged for flow maintenance is at a level sufficient to prevent flooding. The invention makes use of the fact that quite precise values of the "blow through" steam pressure required to avoid filling or flooding any single dryer with condensate have been established, and which are functions of the speed and thermal load of the dryer. The invention provides for measuring whether the flow of blow through steam meets these values by means of a venturi in the conduit for removing the condensate and means for measuring the static pressure difference upstream and at the throat of the venturi. This difference is a function of the quantity of flow, and in order to convert the pressure differential into a signal of the "go-no go" type, a diaphragm is mounted in an indicator housing adjacent having chamber defined by the diaphragm and a sight glass for the housing. This chamber is vented to the venturi throat by suitable conduit means while another chamber defined by the diaphragm and the housing is vented by suitable conduit means to the upstream side of the venturi. A signal element within the first chamber is carried by the diaphragm and is biased to a no flow position by spring means providing a snap action such that when flow through the venturi is sufficient, the pressure reduction in the first chamber will overcome the resistance of the spring and snap the signal element into contact with the glass. Thus the device is calibrated so that the flow indicator signal will be on only when the level of flow through the venturi is at the required value.

Accordingly, it is an object of the present invention to provide a flow indicator for monitoring the flow of "blow through" steam in a manner which indicates when flow of steam is sufficient to prevent flooding by condensation in a dryer or the like.

Another object of the invention is to provide a device as described which requires no skill on the part of the inspector to determine whether a satisfactory level of flow is present.

Another object of the invention is to provide a device as described which utilizes static pressure differential upstream of a venturi and in the throat of a venturi to indicate the flow level of the steam.

Another object of the invention is to provide a device as described wherein diaphragm mounted signal means are responsive to the static pressure differential thus afforded and controlled by a snap acting spring so as to indicate a satisfactory flow condition in a positive manner.

Yet another object of the invention is to provide a device as described which is simple and economical in construction and which may be used in a quantity in a paper machine or the like for the purposes indicated.

Other objects and advantages of the invention will become apparent as the description proceeds in accordance with the drawings in which.

Figure 1:
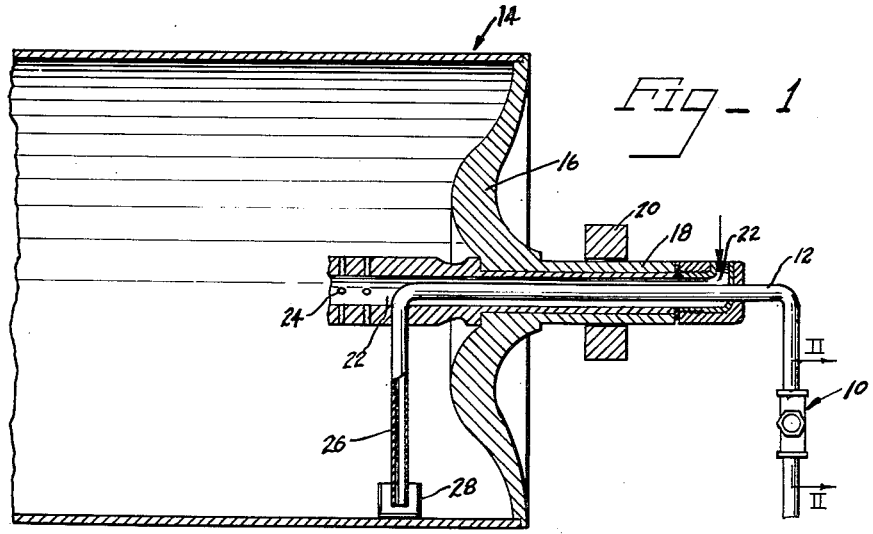
FIGURE 1 is a partially broken away, vertical sectional view of a paper dryer having means for removing condensate therefrom and a flow indicator according to the present invention, the section being taken through the dryer structure and also along a portion of a transverse inner extension of a condensate removal conduit with the indicator being on an outer portion of the conduit.
Figures 2, 3:
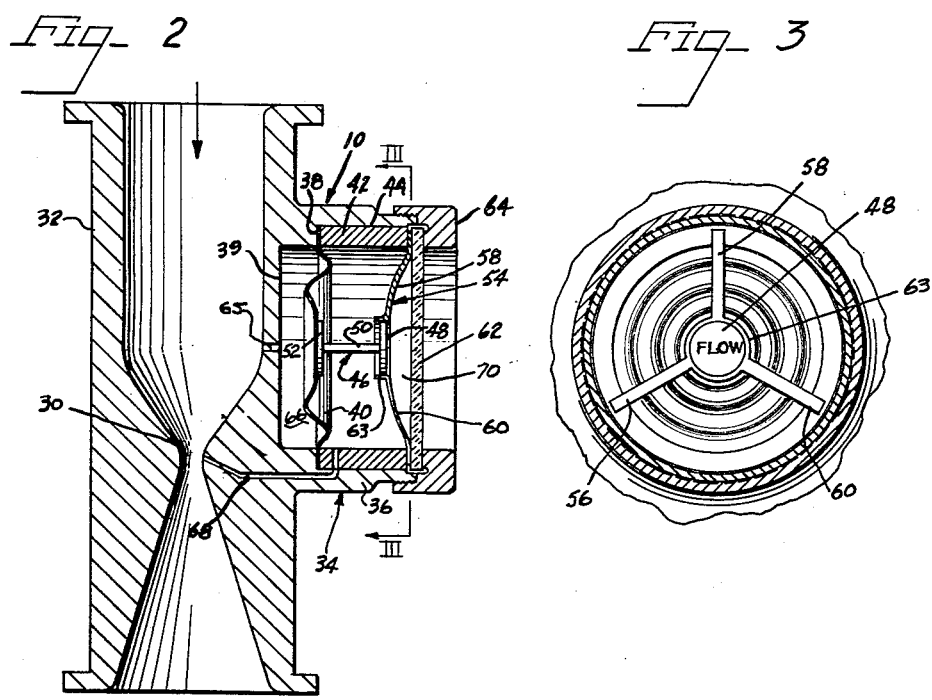
FIGURE 2 is an enlarged vertical sectional view taken along a portion of the line II—II of FIGURE 1.
FIGURE 3 is a vertical sectional view taken along the line III—III of FIGURE 2.

Referring now to the drawings, and to FIGURES 1 through 3 in particular, a flow indicator 10 is shown in operative relation to a conduit 12 for removing condensate from a dryer drum 14 for a paper machine or the like. The dryer 14 may be of conventional construction having an end wall 16 which has an axle 18 extending into journalled relation with a bearing 20. A steam conduit 22 extends coaxially through the axle 18 to dispense steam through suitable apertures 24 as understood by those skilled in the art. The conduit 12 may be provided with the usual rotary steam joint (not shown) and has formed at its inner end a laterally extending portion 26 carrying a scoop 28 for removing condensate from the drum 14.

In order to determine whether the fraction of steam passing through the conduit 12 is sufficient to maintain a desirable rate of condensate removal and so as to avoid flooding in the drum 14, the indicator 10 includes a venturi 30, which may be formed in a separate fitting 32 tapped into the conduit 12. A housing 34 may be formed integrally with the fitting 32, and in the form shown the housing includes a cylindrical wall 36 having an internal annular shoulder 38 in spaced relation to a rear wall 39, against which a diaphragm 40 is positioned by means of an annular retainer 42 telescopically received in a relatively wide diameter portion 44 of the wall 36 extending from the shoulder 38. In order to positively signal that a desired level of "blow through" steam is flowing through the conduit 12, the diaphragm 40 carries a signal 46 which may have a signal disk 48 at one end thereof supported in spaced relation to the diaphragm by a stem 50 and a disk 52 at its other end attached coaxially to the diaphragm. The signal 46 is biased to a retracted position as shown by a snap acting unitary spring 54, which may have normally arched legs as indicated at 56, 58 and 60 which extend into abutting engagement with the outer ends of the annular retainer 42, and a central annular retaining flange 63 engaging the disk 48. A sight glass 62 is provided, and the sight glass, spring and diaphragm are maintained in assembled position by a suitable annular gland or cap 64 threadedly engaged on the outer end of the wall 36 and in abutting engagement with the sight glass.

Since the venturi effects a marked drop in static pressure at its throat relative to the pressure condition upstream thereof, a pressure differential is afforded between the venturi throat and a location upstream thereof which is a function of the quantity of flow of steam through the conduit 12 and fitting 32. Thus steam flows into the conduit 22 as indicated by the arrow in FIGURE 1 and steam and condensate flow through the conduit 12 and fitting 32 as indicated by the arrows in FIGURES 2 and 4. Accordingly, a conduit or port 65 is formed in the wall 39 so as to vent the steam at its upstream pressure condition into a chamber 66 defined by the wall 39 and the diaphragm 40. Likewise, a conduit 68 is defined in the fitting 32 which extends from the throat of the venturi 30, through the wall 36 and the retainer 42 and into a chamber 70 defined by the diaphragm 40 and the sight glass 62. Thus the pressure condition in the chamber 66 will generally be greater than the pressure in the chamber 70, the resultant tendency of the signal 46 to move outwardly being opposed by the spring 54. As hereinabove indicated, the spring 54 is calibrated to provide a relatively great initial resistance to deflection in the direction of the sight glass 62 and a relatively reduced resistance to deflection as the signal moves axially outwardly toward the sight glass to provide a "go-no go" action for the signal.

In operation, therefore, when the flow of "blow through" steam through the conduit 12 is sufficient to clear condensate from the dryer 14, the static pressure differential between the static pressure at the throat of the venturi 30 and upstream thereof, and consequently between the chamber 66 and the chamber 70 will be such as to snap the signal 46 outwardly so that its signal disk 48 abuts the sight glass 62. Thereby an inspector can immediately determine that the flow of steam through the conduit is sufficient. However, when a diminution in the flow of steam through conduit 12 occurs such that the flow is below the requisite level the spring 54 will snap the signal 46 out of engagement with the sight glass 62 and the steam in the chamber 70 will tend to obscure the signal disk 48. It will be noted that suitable indicia may be formed on the front face of the disk 48 as shown in FIGURE 3, so that when the disk is in engagement with the sight glass 62 there will be no possible question as to what the level of flow is.

Although other forms of flow restriction means may be provided, the venturi construction herein set forth has the advantage that the pressure downstream therefrom is substantially equivalent to the pressure upstream so that no permanent pressure drop of significant value is effected thereby. Accordingly the indicator of the invention does not distort the flow which it is measuring.

Figure 4:
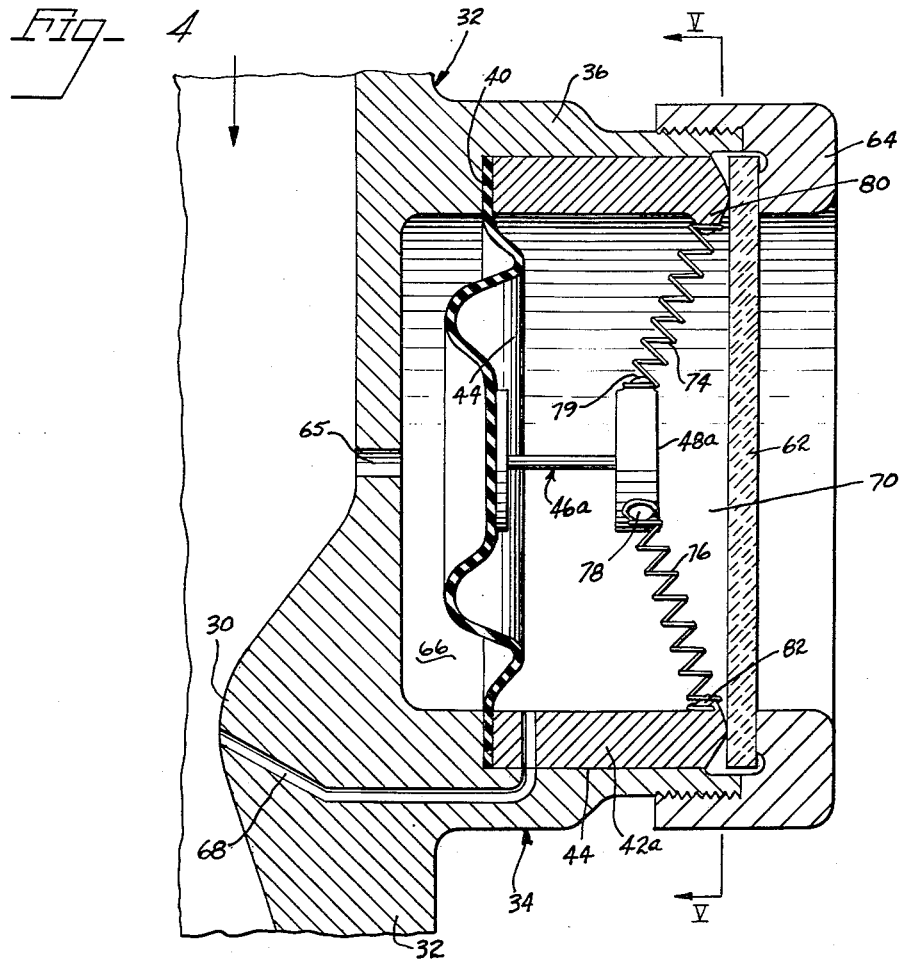
FIGURE 4 is a further enlarged fragmentary vertical sectional view of a flow indicator according to a second embodiment of the invention taken through a broken away portion of a fitting for the conduit having the indicator formed thereon.
Figure 5:
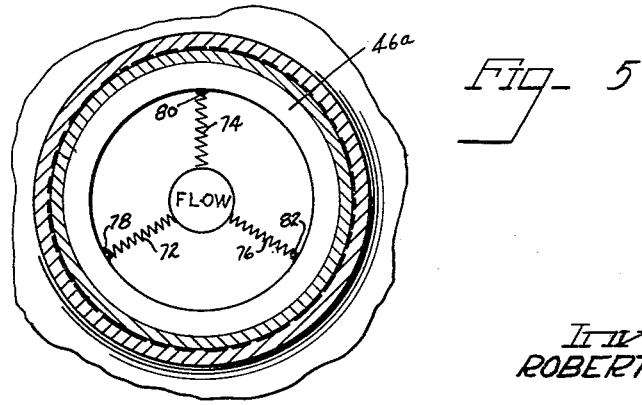
FIGURE 5 is a vertical sectional view on a reduced scale taken along the line V—V of FIGURE 4.

Referring now to FIGURES 4 and 5, a second embodiment of the invention is disclosed wherein similar parts are indicated by similar reference numerals. This indicator is substantially identical to the indicator shown in FIGURES 1 through 3, except that the spring means thereof comprises a plurality of substantially helical springs 72, 74 and 76 connected by suitable bolt means or the like such as indicated at 78 and 79, to the signal disk 48a at their inner ends and bearing against suitable bosses or projections 78, 80 and 82 at their outer ends which may be formed preferably integrally with the retainer 42a. The springs 72—76 are similarly calibrated so that they exert decreasing force on the signal element 46a with increasing axially outward displacement thereof. Other spring constructions and biasing means may also be utilized having an initial resistance characteristic as described, to afford a snap action for the signal element of the invention. The spring means for controlling the action of the signal is in each instance calibrated to suit the range of flow desired, the dimensions of the venturi being selected in terms of the expected flow rate. These dimensions are not critical inasmuch as calibration may be afforded over a relatively wide range.

Since condensed water has a specific volume of less than 1/100 the volume of the steam, the intermittent slugs of water passing through the venturi will not affect the condition of the signal even though they will afford a pulse of short duration in the pressure at the venturi throat and upstream of the venturi.

It will be appreciated, therefore, that a highly reliable and extremely simple indicator has been provided which effects a positive indication of the level flow of blow through steam without requiring any effort or skill on the part of the operator. The device may be economically manufactured, in contrast to flow meters of the usual type, and may be constructed to meet a wide variety of conditions and applications, as for example, the housing for the indicator may be formed as a separate unit.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A flow indicator for indicating whether flow through a conduit is at or above a predetermined level comprising a venturi adapted to be connected into a conduit and having a restricted venturi throat,
 a downstream portion preceding the throat and upstream portion following the throat,
 a flow indicator housing having a peripheral wall,
 a visually penetrable end wall and an end wall opposite said visually penetrable end wall,
 a diaphragm in the peripheral wall and extending between the end walls in spaced relation thereto,
 a signal element mounted on the diaphragm,
 snap acting spring means urging the diaphragm and signal element away from the visually penetrable wall,
 a conduit leading from the venturi throat to the one of said chambers between the diaphragm and the visually penetrable wall and a conduit leading from the upstream portion of the venturi to the other of said chambers, said spring means and signal element coacting to snap the signal element against the visually penetrable wall to produce a visually determinable indication of a predetermined level of flow through the venturi,
 in response to differential pressures in the first and second chamber.

2. The device according to claim 1 wherein said spring means includes a unitary spring having normally arched legs engaging said visually penetrable wall and a center engaging said signal element,
 to urge the signal element away from the said visually penetrable wall.

3. The device according to claim 1 wherein said spring means includes a plurality of helical spring members urging said signal element away from said visually penetrable wall.

4. The device according to claim 1 wherein said one of said chambers is bounded by said visually penetrable wall and said diaphragm and is fully sealed except at said conduit from said venturi flow.

5. The device according to claim 1 wherein said visually penetrable wall is a sight feed glass.

(References on following page)

References Cited in the file of this patent

UNITED STATES PATENTS

| | | |
|---|---|---|
| 1,340,198 | Wilkinson | May 18, 1920 |
| 2,406,181 | Wiegand | Aug. 20, 1946 |
| 2,696,679 | Cram | Dec. 14, 1954 |
| 2,888,898 | Patterson | June 2, 1959 |
| 2,948,151 | Astl | Aug. 9, 1960 |

FOREIGN PATENTS

| | | |
|---|---|---|
| 1,083,459 | France | Jan. 10, 1955 |
| 540,132 | Italy | Feb. 29, 1956 |